C. S. HUNT & J. B. KNIGHT.
APPARATUS FOR UTILIZING MARSH OR OTHER NATURAL GASES.
No. 77,982. Patented May 19, 1868.
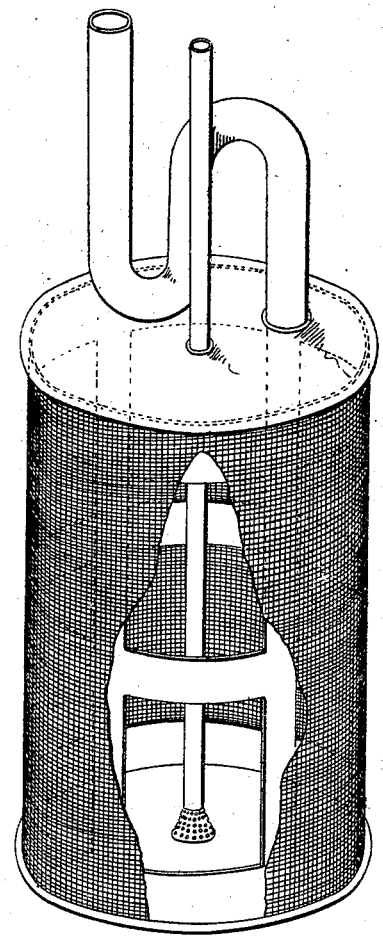

United States Patent Office.

C. S. HUNT, OF PARISH OF TERREBONNE, AND JACOB B. KNIGHT, OF NEW ORLEANS, ASSIGNORS TO C. S. HUNT, AND WILLIAM F. PRATT, AND PETER M. PETERSON, OF NEW ORLEANS, LOUISIANA.

Letters Patent No. 77,982, dated May 19, 1868.

IMPROVED APPARATUS FOR COLLECTING MARSH AND OTHER GASES.

The Schedule referred to in these Letters Patent and making part of the same.

TO ALL WHOM IT MAY CONCERN:

Be it known that we, C. S. HUNT, of the parish of Terrebonne, in the State of Louisiana, and JACOB B. KNIGHT, of the city of New Orleans, and same State, have invented a certain new, useful, and improved Apparatus for Eliminating, Collecting, Conducting, Continuing the Flow of and Carburetting Marsh-Gas, (hydride of methyle,) or any other gas of natural or spontaneous production below the surface of the earth, to the end of utilizing the same by applying it to illuminating and heating purposes.

It is well known that, underlying the surface of the alluvial deposits in the State of Louisiana, and other localities of similar geological characteristics, at varying depths below the surface, a gas-bearing stratum exists, that is generally understood to be of vegetable origin and composition, which produces marsh-gas in large quantity, in the process of some continuous geological or chemical transformation.

Hitherto this gas has not been applied to any practical use, but is now known to be inflammable. The difficulty that has prevented its use has been the filling up of the lower or receiving-end of the conduit-pipe with mud or other earthy matter that is set in motion and introduced into the said pipe by the flow of the gas, or of water, and which thus consequently stops the flow of the gas. This gas burns readily, and gives out great heat in its natural state, but its nature is such that it requires an addition of carbon, or its equivalent, to develope, in its combustion, a high degree of illuminating power.

Our invention is intended to remedy the difficulties to which we have adverted, and to supply the needed carbon, and it consists of an apparatus, which will be at once clearly understood by referring to the drawing.

Upon the drawing, A represents a chamber, provided with a closed top and bottom, a and b, and a vertical enclosing-wall of wire gauze, that is sustained by an interior skeleton framework, as shown.

The chamber A, as represented, is cylindrical, and this being the strongest, is, for that reason, the best form, but, obviously, it may be of any form that experience may show to be necessary, From the top of the chamber A, at any point therein, rises the gas-pipe C, bent, as shown at c, in order that a constant supply of gasoline, oil of turpentine, or other hydrocarbon liquid may be kept in it, to carburet the gas, and thus increase its illuminating properties. The flexure in the pipe may be anywhere between the chamber A and the point at which the gas is applied to use. If found desirable, charcoal, in a finely-broken or divided condition, may also be put into pipe C.

Whenever there is a flow of water with the gas, in quantity sufficient to bring it into the pipe C, no flexure or crook in the same is necessary, because the carburetting-agent, having less specific gravity than water, will float upon the latter, and be thus kept in the pipe.

In the use of a straight pipe, charcoal may also be used in connection with a carburetting-liquid, that is supported upon water, by enclosing it in an elongated wire-gauze bag, and suspending it in the liquid, or by introducing a perforated diaphragm in the pipe, at or near the surface of the water, on which the charcoal may rest and be supported, although put in the pipe in loose form.

Above the surface of the ground, the pipe C may connect with a gasometer or reservoir, to receive and distribute the gas, or it may lead directly into pipes that will conduct it to the point or points at which it is to be applied to heating or lighting uses, without the interposition of a gasometer or other reservoir or receptacle.

Through the centre of the top of the chamber A, and extending to the bottom thereof, is the pump D, (which may be provided with any suitable valves and operating appliances,) at the bottom or lower extremity of which is an enlarged perforated foot, d, as shown.

The chamber A may be of any size, its capacity for collecting the gas being, of course, in precise proportions to its dimensions, but when very large it might become necessary to reinforce the skeleton framework upon which the wire-gauze wall or walls is supported, as well as its top, by a system of internal beams and braces, which any mechanic will readily adjust.

If the chamber A be of considerable size, an excavation is necessary, in order to place it in position in the gas-producing stratum, and, in refilling such excavation, care must be taken to put in brush around the chamber, or the same substance that was withdrawn, or something else that will not be impervious to the gas, and so prevent its flow into the chamber.

If the chamber is very small, and desiged for some restricted local use, as, for example, a street-lamp, or a single house, or the like, it may be forced or driven into its subterranean position without any excavation being made to get it down. But, in such case, it would be requisite to provide a sharp penetrating point at its lower extremity, and, probably, to introduce the pump through the gas-pipe, the latter being sufficiently larger than the former to allow of the free ascent of the gas between them.

The chamber A being sunk into the gas-producing stratum, and covered in, the operation or effect is as follows, to wit: The gas flows into it from every direction, the wire-gauze wall interposing no obstruction to its rapid admission, whilst it effectually prevents the intrusion of solid substances, except in minute and impalpable form, and thence through the pipe C, and the carburetting-agent that has been placed therein, to the gasometer or point at which it is to be applied to use. The pump D will free the chamber of earthy matter, whenever necessary, even although it enter the same in dry form, because, in that case, water may be poured into the chamber through the pump or gas-pipe, for the purpose of bringing this matter within the power of the pump, by the saturation and softening of the same; or, if need be, the water, when it is present, may be entirely withdrawn with such earthy matter, by the pump, and the whole space within the chamber be thus left or secured for holding the gas.

Our invention, although designed especially for use in connection with marsh-gas, may, nevertheless, be used for collecting and bringing continuously to the surface of the earth any natural gas that will burn, and is thus susceptible of application to the uses of man, whatever may be its name or character, or the locality in which it is found.

Having thus described our invention, what we claim, and desire to secure by Letters Patent, is—

1. The chamber A, or its equivalent, in combination with a gas-pipe, C, and a pump, D, when these several parts are constructed substantially as and for the purpose set forth.

2. The chamber A, or its equivalent, in combination with a pump, D, and a gas-pipe, C, when the latter is partially filled with a hydrocarbon liquid or other agent, for carburetting or increasing the illuminating power of the gas, substantially as herein described, for the purposes set forth.

C. S. HUNT,
J. B. KNIGHT.

Witnesses:
 RUFUS R. RHODES,
 LYMAN HARDING.